Aug. 3, 1937.　　　F. E. BACHMAN　　　2,089,048
ROLLER BEARING
Filed Feb. 2, 1931　　　3 Sheets-Sheet 1
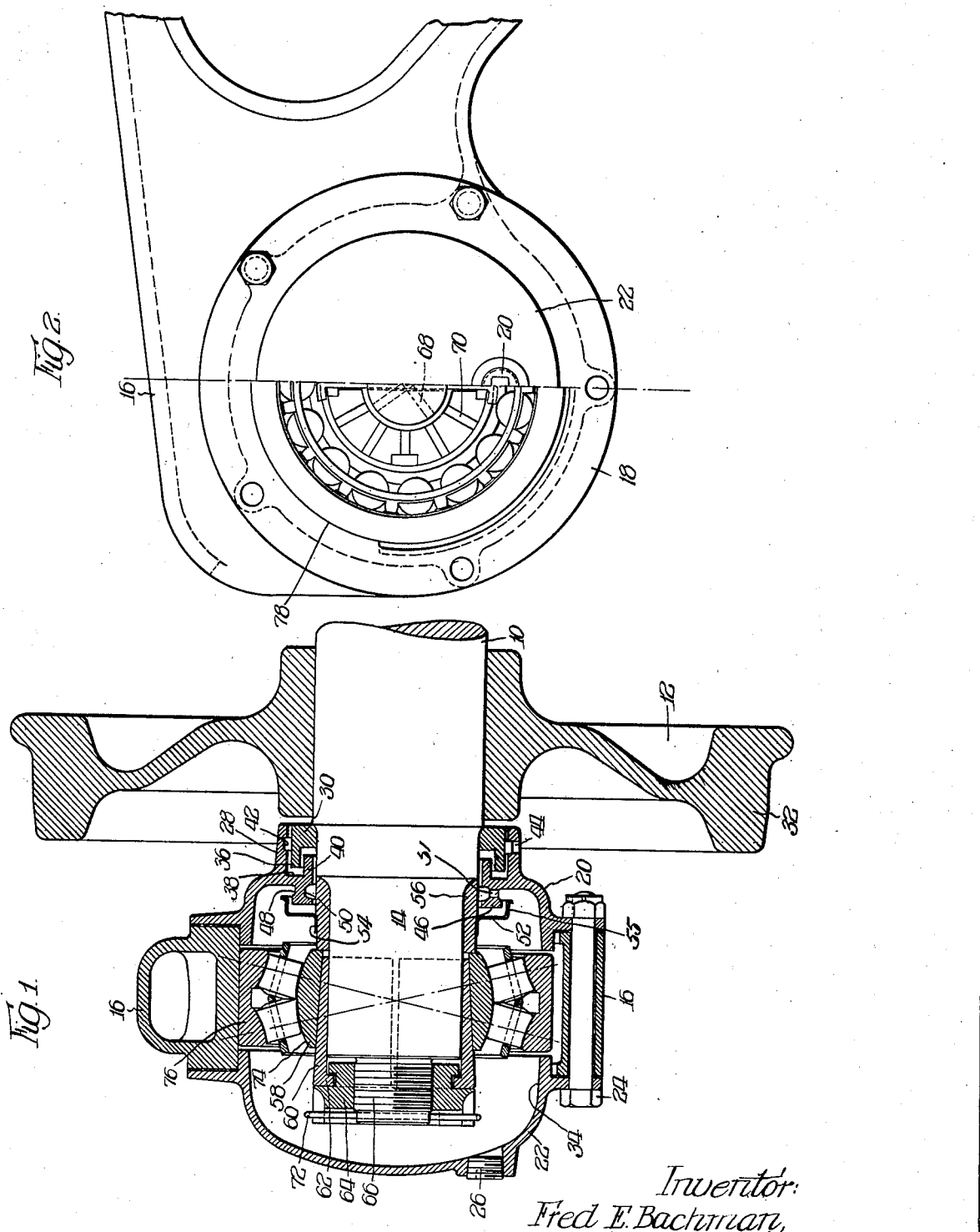
Inventor:
Fred E. Bachman,

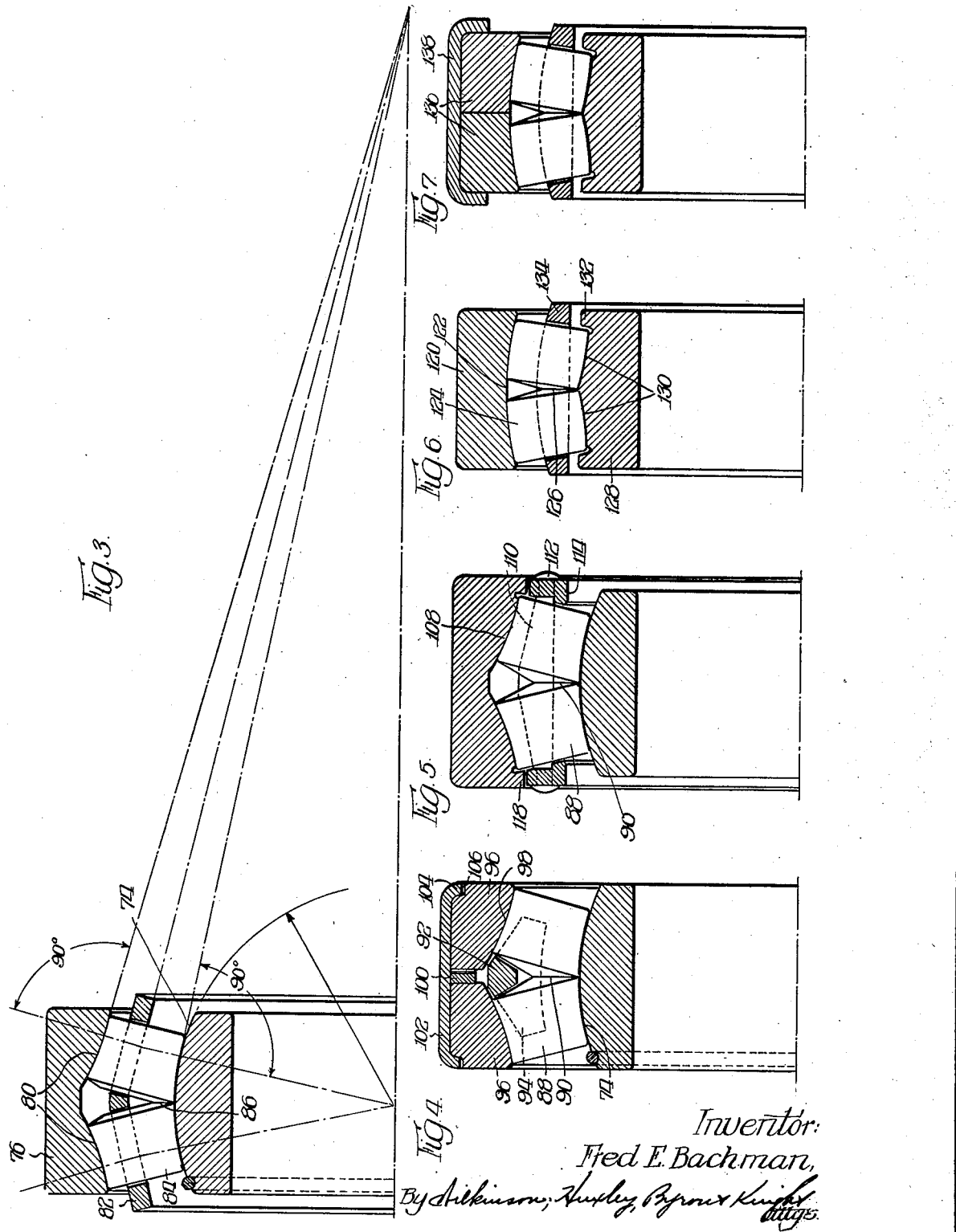

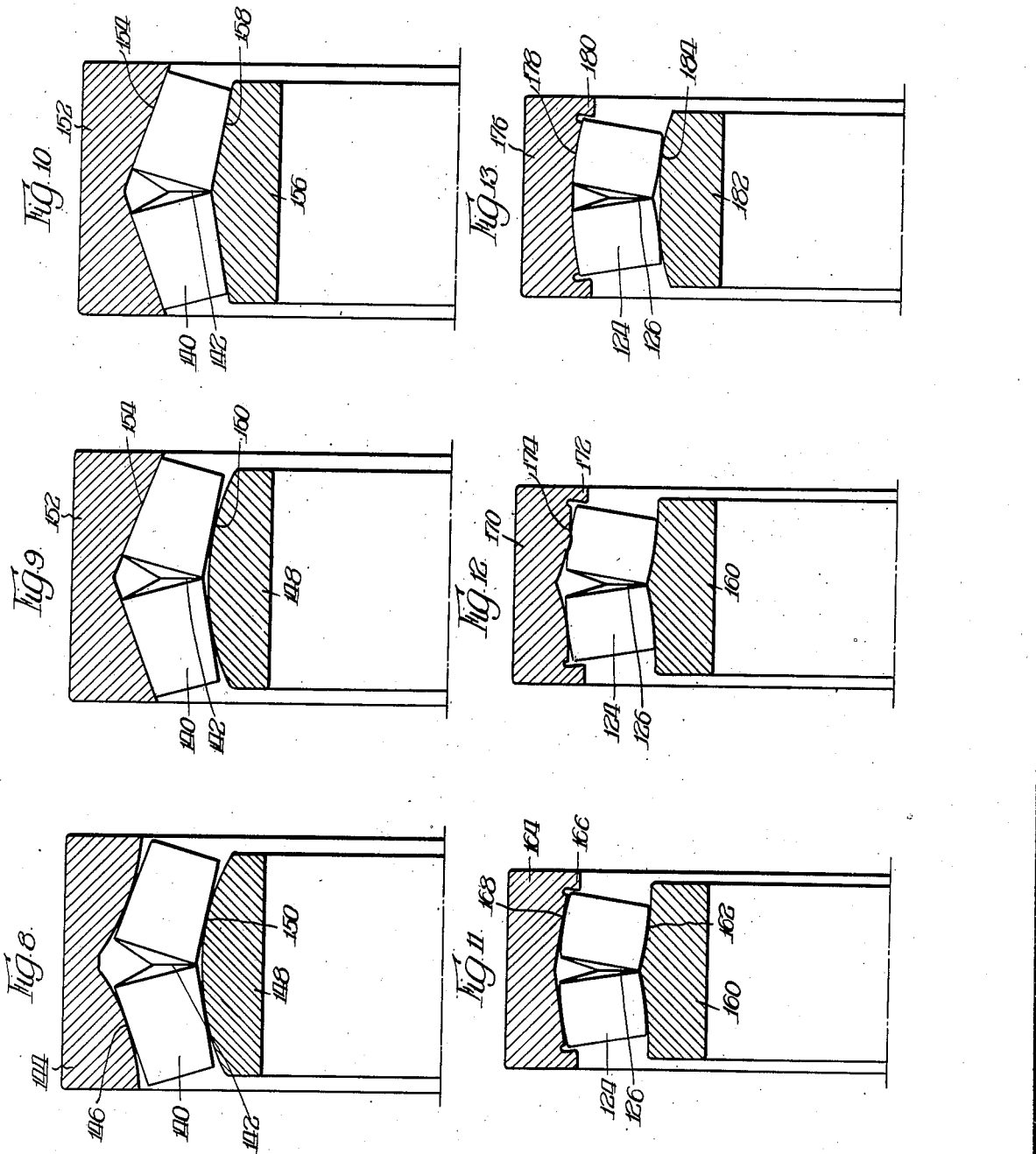

Patented Aug. 3, 1937

2,089,048

UNITED STATES PATENT OFFICE 2,089,048

ROLLER BEARING

Fred E. Bachman, Chicago, Ill., assignor to American Steel Foundries, Chicago, Ill., a corporation of New Jersey Application February 2, 1931, Serial No. 512,805

15 Claims. (Cl. 308—214)

This invention pertains to railway rolling stock, and more particularly to wheel and axle assemblies and associated parts of railway vehicles embodying anti-friction bearings.

In some classes of railway vehicles, particularly the lighter type of passenger vehicles and freight cars, it is desired to provide a wheel and axle assembly which is of the anti-friction type but which is as light and as inexpensive as possible. In this type of vehicle, an assembly may be provided which is adapted for use with the A. R. A. journal boxes, or which is suitable for use with a special type of journal box. The anti-friction bearings should be of a type to take both vertical load and end thrust, and should be self-aligning to accommodate themselves to any axle deflection which may occur, even though the bearings be disposed as nearly as possible in alignment with the side frames.

It is therefore an object of this invention to provide a wheel and axle assembly adapted for use with railway rolling stock wherein an anti-friction bearing is provided adapted to take both vertical load and end thrust, and is adapted to be self-aligning.

A further object is to provide an anti-friction bearing assembly adapted for use with a revoluble axle, and one which fulfills all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation through a wheel and axle assembly and associated side frame showing the application of the invention thereto;

Figure 2 is a fragmentary side elevation of the assembly shown in Figure 1, the left half of the journal box cover being broken away to show the bearing assembly;

Figure 3 is an enlarged sectional elevation of a form of anti-friction bearing assembly which may be used in the assembly illustrated in Figures 1 and 2; and Figures 4 to 13 inclusive are enlarged sectional elevations of modified forms of bearing assemblies adapted for use with the assembly illustrated in Figures 1 and 2.

Referring first of all more particularly to Figures 1 and 2, while only a portion of the assembly is shown, it of course is understood that the parts are duplicated on the opposite side of the assembly.

The revoluble axle 10 is provided with the wheel 12 fixedly mounted thereon, said axle being formed with the bearing portion 14 which extends outwardly of the wheels 12 and substantially into the plane of the side frame 16. The side frame is looped around the axle portion 14 as at 18 to accommodate the inner and outer closure plates 20 and 22 forming the journal box, said closure plates being bolted or otherwise secured to the side frame as at 24. The outer closure plate is provided with the oil fill plug 26, and the inner closure plate is provided with the flanged portion 28 overlapping or embracing the collar 30 which is fixedly secured to the axle 10, it being seen that the collar 30 and the flange 28 extend within the space defined by the planes passing through the inner and outer edges of the tire tread 32 in order that the journal box will provide a generous oil well 34.

The collar 30 is provided with an outwardly extending flange 36 extending into the recess 38 formed between the flange 28 and the outwardly extending flange 40. The flange 28 is provided with the circular groove 42 having apertures 44 in the base thereof to trap any water or dirt which may enter from the exterior and permit the same to drain from the groove through the apertures. The inner cover plate is also provided with the inwardly extending flange 46 provided with the groove 48 which is adapted to conduct lubricant to the lower portion of the journal box after movement of the axle has ceased, the groove 50 being also provided on the opposite side of the flange 46, said groove being provided with apertures 51 for trapping lubricant and permitting it to drain to the lower portion of the journal box.

The baffle plate 52 is provided on the shrink collar 54 positioned on the outer portion of the axle 10, said baffle being substantially Z-shaped and provided with the flange 55 overlapping the flange 46 whereby lubricant is deflected from the flange 46. The shrink collar 56 provides means for positioning the inner race ring or cone 58 of the roller bearing assembly, the inner surface of the cone being built on a taper to accommodate the tapered sleeve 60 which is interposed between the axle and the inner race ring. The sleeve is provided with the inwardly extending flange 62 fitting into the groove formed on the nut 64, said nut being adapted to have threaded engagement with the portion 66 of the axle whereby movement of the nut adjusts the sleeve to wedge the inner race ring into fixed relation with respect to the axle 10. The end 66 of the axle is provided with radially disposed grooves 68 adapted to be aligned with grooves 70 provided in the nut for the purpose of accommodating a locking cotter 72. The roller engaging surface 74 of the inner race ring 58, shown in both Figures 1 and 3, is a spherical or convex surface, and the outer race ring 76, which is adapted to seat in the side frame as shown at 78 for slightly less than 180°, is provided with a pair of spaced convexed or spherical roller cooperating surfaces 80, the tangents thereto being inclined downwardly and outwardly.

A roller cage 82 having roller cooperating parts thereof of angular configuration is provided with perforations into which the rollers 84 fit, the perforations so holding the rollers that each pair of rollers is constantly in proper position to thrust against the others, thereby eliminating any other means on the roller or races whereby the rollers are prevented from traveling endwise. The rollers 84 are so designed that their inner ends abut each other and have a larger diameter than the other ends. Therefore there will be no tendency for these rollers to operate in any other position than that shown in Figures 1 and 3. The roller abutting surfaces are provided with frusto-conical engaging portions 86 for wear, smooth-running and thrust purposes.

In the constructions shown in Figures 4 and 5, the inner race ring is provided with the convexed or spherical roller engaging surface 74, and the rollers 88 are of substantially the same general configuration, with the exception that the roller engaging surfaces 90 are conical. In Figure 4, the cage 92 does not surround the rollers, but is provided with spaced fingers 94 serving to properly align the courses of the rollers. The outer race ring is made in two parts, each part 96 being provided with the convexed or spherical roller engaging surfaces 98, the races being spaced by the member 100 and locked in assembled position by the ring 102 provided with the depending flanges 104 fitting in recesses 106 provided in each of the outer race rings.

In the construction shown in Figure 5, while the rollers are of the same configuration as shown in Figure 4, the outer race ring is a unitary structure provided with the roller contacting surfaces 108 of convexed or spherical character. In this case the cage comprises the spaced bars 110 fastened as at 112 to the outer ring members 114, and in this case the outer race ring is provided with the roller embracing shoulders 118 which may act as thrust surfaces.

In the construction shown in Figure 6, the outer race ring 120 is provided with the concave surface 122 having cooperative relation with the rollers 124, said rollers being substantially barrel shaped, having the convexed race engaging surfaces, the ends of the rollers being of substantially the same diameter. The inner roller engaging surfaces 126 are conical, and the inner race ring 128 is provided with a pair of concave roller engaging surfaces 130, and the inner race ring is provided with the thrust shoulder or upwardly extending flanges 132. The rollers are maintained in the proper position in the courses by the unitary cage 134.

In the construction shown in Figure 7, the inner race ring, the rollers, the cage and the outer race ring are substantially the same as those described in Figure 6, with the exception that the outer race ring is made in two parts 136, the parts being maintained in assembled position by means of the embracing ring 138.

In the constructions shown in Figures 8, 9 and 10, the rollers 140 disposed in the courses are generally frusto-conical in shape, preferably having the larger ends disposed adjacent the center line of the bearing assembly. The roller engaging surfaces 142 of the rollers are preferably conical, and any suitable cage (not shown) is provided to maintain the rollers in proper running position. In the construction shown in Figure 8, the outer race ring 144 is provided with a pair of slightly convexed roller engaging surfaces 146, the inner race ring 148 being provided with the convexed roller engaging surface 150.

In the construction shown in Figure 9, the inner race ring 148 is maintained with the convexed roller engaging surface 150, but the outer race ring 152 is provided with the sloping roller engaging surface 154 made up of straight line elements. That is, it corresponds to the slope of the surface of the rollers.

In Figure 10, the outer race ring 152 is of the same character as that described for the construction shown in Figure 9, having the roller cooperating surface 154 made up of straight line elements, and in this case, the inner race ring 156 is also provided with the roller cooperating surface 158 of straight line elements coinciding substantially with the elements in the rollers.

In the constructions illustrated in Figures 11, 12 and 13, the rollers 124 are shown provided with conical roller cooperating surfaces 126. In this case the inner race ring 160 is provided with the concave roller cooperating surfaces 162 corresponding substantially to the elements of the surfaces of the rollers. The outer race ring 164 is provided with the thrust shoulders 166 embracing the courses of the rollers, and the roller cooperating surfaces 168, as shown, are of straight line elements, though concaved elements substantially as shown in Figures 6 and 7 may be used.

In the construction shown in Figure 12, the inner race 160 is retained, but the outer race 170 is provided with the embracing shoulders 172, and the roller cooperating surfaces 174 are slightly convexed.

In the construction illustrated in Figure 13, the outer race ring 176 is provided with the concave roller cooperating surface 178 corresponding to the surface 122 in Figure 6, but the thrust shoulders 180 are provided on the outer race ring. In this case the inner race ring 182 is provided with a pair of slightly convexed roller cooperating surfaces 184, though of course it is to be understood that substantially straight roller cooperating surfaces may be used similar to those shown in Figure 11 on the outer race ring thereof.

With the constructions shown and described, it will of course be appreciated that a self-aligning anti-friction bearing is provided with a dual set of rollers of simple and improved design, and with such constructions a ready application may be made to cars of light service or freight car construction, and it will be readily appreciated that with this construction the outer race ring may be readily inserted in the usual A. R. A. type of journal box instead of directly in the special side frame shown. It is to be understood that in the claims the use of the terms "conical contacting portions", "conical end portions", "conical portions" and the like, is to be interpreted broadly to include bearing members having complete conical ends, such as shown for example in Figure 4, or partial or frusto-conical ends, as shown in Figures 1 and 3.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A roller having an end of larger diameter than the other end, one of said ends having a conical bearing surface, the elements forming the bearing surface of said roller being concave.

2. A roller having an end of larger diameter than the other end, one of said ends having a frusto-conical bearing surface, the elements forming the bearing surface of said roller being arcuate.

3. A roller having an end of larger diameter than the other end, one of said ends having a frusto-conical bearing surface, the elements forming the bearing surface of said roller being arcuate inwardly.

4. A self-aligning roller bearing comprising spaced racerings, one of said racerings having a plurality of adjacent convex bearing surfaces, the other of said racerings having a continuous convex bearing surface, and a plurality of courses of rollers disposed therebetween and having concaved bearing elements cooperating with said surfaces, said rollers having conical contacting portions.

5. A self-aligning roller bearing comprising spaced racerings, one of said racerings having a plurality of adjacent convex bearing surfaces angularly disposed with one another relative to the axis of said bearing, the other of said racerings having a continuous convex bearing surface, and a plurality of courses of rollers disposed therebetween and having concaved bearing elements cooperating with said surfaces, said rollers having conical contacting portions.

6. A self-aligning roller bearing comprising spaced racerings, one of said racerings having a plurality of adjacent convex bearing surfaces sloping outwardly and toward the axis of said bearing, the other of said racerings having a continuous convex bearing surface, and a plurality of courses of rollers disposed therebetween and having concaved bearing elements cooperating with said surfaces, said rollers having conical contacting portions.

7. A self-aligning roller bearing comprising spaced racerings, one of said racerings having a plurality of adjacent convex bearing surfaces, the other of said racerings having a continuous convex bearing surface, and a plurality of courses of rollers disposed therebetween and having concaved bearing elements cooperating with said surfaces, said rollers having contacting portions formed from a cone.

8. A self-aligning roller bearing comprising spaced racerings, one of said racerings having a plurality of adjacent convex bearing surfaces angularly disposed with one another relative to the axis of said bearing, the other of said racerings having a continuous convex bearing surface, and a plurality of courses of rollers disposed therebetween and having concaved bearing elements cooperating with said surfaces, said rollers having contacting portions formed from a cone.

9. A self-aligning roller bearing comprising spaced racerings, one of said racerings having a plurality of adjacent convex bearing surfaces sloping outwardly and toward the axis of said bearing, the other of said racerings having a continuous convex bearing surface, and a plurality of courses of rollers disposed therebetween and having concaved bearing elements cooperating with said surfaces, said rollers having contacting portions formed from a cone.

10. A self-aligning roller bearing comprising spaced racerings, one of said racerings having a plurality of adjacent convex bearing surfaces, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers.

11. A self-aligning roller bearing comprising spaced racerings, one of said racerings having a plurality of adjacent convex bearing surfaces angularly disposed with one another relative to the axis of said bearing, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers.

12. A self-aligning roller bearing comprising spaced racerings, one of said racerings having a plurality of adjacent convex bearing surfaces sloping outwardly and toward the axis of said bearing, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers.

13. A self-aligning roller bearing comprising spaced racerings, one of said racerings having a plurality of adjacent convex bearing surfaces, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers, said cage having a portion disposed between the ends of the rollers of adjacent courses and laterally extending fingers disposed between the adjacent rollers of each course.

14. A self-aligning roller bearing comprising spaced racerings, one of said racerings having a plurality of adjacent convex bearing surfaces angularly disposed with one another relative to the axis of said bearing, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers, said cage having a portion disposed between the ends of the rollers of adjacent courses, and laterally extending fingers disposed between the adjacent rollers of each course.

15. A self-aligning roller bearing comprising spaced racerings, one of said racerings having a plurality of adjacent convex bearing surfaces sloping outwardly and toward the axis of said bearing, the other of said racerings having a continuous convex bearing surface, a plurality of courses of rollers disposed therebetween and having concaved bearing elements cooperating with said surfaces, said rollers having contacting portions formed from a cone, and a single cage for said courses of rollers, said cage having a portion disposed between the ends of the rollers of adjacent courses and laterally extending fingers disposed between the adjacent rollers of each course.

FRED E. BACHMAN.